United States Patent
Uthe

[15] 3,693,158
[45] Sept. 19, 1972

[54] METHOD AND APPARATUS FOR ULTRASONIC WELD QUALITY ANALYSIS EMPLOYING PLURAL ANALYSIS SIGNALS

[72] Inventor: Paul M. Uthe, Livermore, Calif.

[73] Assignee: Uthe Technology, Inc., Mountain View, Calif.

[22] Filed: April 1, 1970

[21] Appl. No.: 24,547

[52] U.S. Cl. .......................... 340/172 R, 340/147 R
[51] Int. Cl. ............................................. H04q 1/20
[58] Field of Search ...................... 340/172; 219/109

[56] References Cited

UNITED STATES PATENTS

| | | | |
|---|---|---|---|
| 3,082,405 | 3/1963 | Hanak | 340/172 X |
| 3,341,816 | 9/1967 | Davis | 340/172 |
| 3,506,967 | 4/1970 | Foley | 340/172 |
| 3,034,057 | 5/1962 | Ferguson | 219/109 X |
| 3,334,297 | 8/1967 | Pfaelzer | 219/109 X |
| 3,349,217 | 10/1967 | Helms | 219/109 X |
| 3,384,733 | 5/1968 | Burbank | 219/109 |
| 3,445,768 | 5/1969 | Ferguson | 219/109 X |
| 3,582,967 | 6/1971 | Beckman | 219/109 UX |

Primary Examiner—Harold I. Pitts
Attorney—Limbach, Limbach & Sutton

[57] ABSTRACT

A method and apparatus for monitoring parameters indicating the quality of an ultrasonic weld process. A signal that is the function of the transducer and load impedance is first operated on by taking its logarithm. That signal is differentiated to provide a signal indicative of the smoothness of the machine movement; the negative portion of the machine signal is looked at during a selected time frame to detect the weld. The logarithm of the impedance signal is also integrated to provide a signal indicating the cleanness of the weld. The transducer voltage or current can also be monitored to assure that the desired amplitude is applied over an optimum time period.

16 Claims, 12 Drawing Figures

3,693,158

METHOD AND APPARATUS FOR ULTRASONIC WELD QUALITY ANALYSIS EMPLOYING PLURAL ANALYSIS SIGNALS

BACKGROUND OF THE INVENTION

This invention relates to an electronic circuit and method for analyzing the quality of the ultrasonic bonding or welding process.

U.S. patent application Ser. No. 888,330, now U.S. Pat. No. 3,636,456 filed Dec. 29, 1969 titled Impedance Measuring Network; inventor, Loren G. Wright: and assigned to the assignee of the present invention, discloses and claims an electronic circuit suitable for use with an ultrasonic power supply of the type described in U.S. Pat. No. 3,445,750 to P.M. Uthe, Jr., et al. In the Uthe, Jr., et al. patent, a low output impedance power supply is directly connected to an ultrasonic transducer of the type used for cleaning, soldering, drilling, bonding, brazing and welding of materials and a feedback loop is provided to correct for changes in the transducer and load in order to maintain constant transducer current (for driving magnetostrictive transducers) or voltage (for driving ferroelectric and piezoelectric transducers).

It has been found that the variations in transducer voltage or current reflected in the changes in the feedback loop voltage are a measure of changes in transducer and load impedance. Further, the manner of these impedance variations is uniquely related to such factors as the mechanical connection of parts of the bonder such as the horn or a magnet of the transducer or the transducer mounting bracket, the amount of friction in those bearings of the bonder allowing rotation of the transducer, the electrical connection of the transducer to the power supply, the hardness of the wire being bonded, the surface conditions of the parts being joined and the quality of the bond formed.

The impedance measuring network of the Loren G. Wright application provides a signal output responsive to the impedance changes of a transducer and load used with the ultrasonic power supply of the referenced Uthe, Jr., et al. patent.

It is an object of the present invention to provide a method for readily ascertaining ultrasonic weld process quality in response to the signal output from the impedance measuring network of said referenced application. It is a further object to provide apparatus for readily ascertaining ultrasonic weld process quality in response to said impedance measuring network.

The present invention is particularly suited for quality control use with an ultrasonic transducer for providing welds between miniature members such as wire bonding contacts of integrated circuits. Additionally, the present invention includes certain aspects particularly related to ultrasonic wire bonding techniques, and accordingly the invention will be described for purposes of full disclosure as well as purpose of illustration as practiced with apparatus for ultrasonic wire bonding.

SUMMARY OF THE INVENTION

An electronic circuit apparatus is provided in one embodiment for analyzing impedance variation waveforms received from said impedance measuring network.

Various aspects of the welding process are analyzed by performing computational operations on the impedance waveform. Displays are provided to show if the aspects of the process are within tolerable limits. In order to determine proper machine operation during the initial time portion, to detect friction or jerk, the logarithm of the signal is differentiated with respect to time. The cleaning process is sensed by integrating the logarithm of the waveform to provide an indication of the energy being expended at the weld junction. The dip and rise occuring at the weld point of the waveform is sensed by a negative-looking diode. In addition, means are provided for accurately double-checking the timing and transducer current level of the power supply.

DESCRIPTION OF THE PREFERRED EMBODIMENTS

Figure 1:
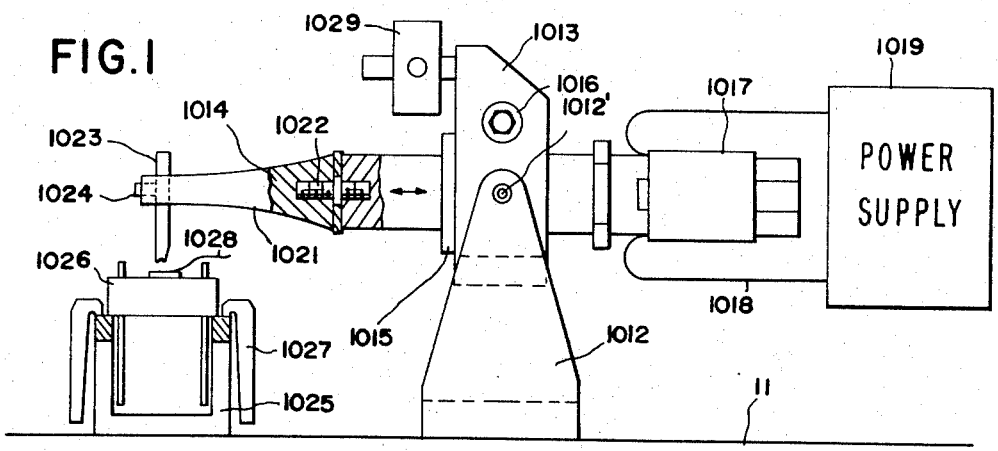
FIG. 1 is a schematic side elevational view showing the general elements used to practice ultrasonic wire bonding where the present invention can be useful.

Referring now to the drawing with particular reference to FIG. 1, there is shown a schematic side elevational view of apparatus useful in ultrasonic wire bonding. The apparatus including a base or support frame 1011 on which is located a mounting yoke 1012 pivotally connected to a hollow cylindrical clamping member 1013 within which a transducer 1014 is held by way of a collar 1015 onto which the clamp is tightened, such as by means of a screw or bolt 1016. The transducer 1014 is any one of a variety of structures for converting electrical energy into high frequency motion. The transducer 1014 includes in or on its body an active element 1017 which is typically either magnetostrictive or electrostrictive. High frequency electrical energy such as in the range of 60 KHz connected to the active element 1017 via lead 1018 from a power supply 1019 results in vibration of the transducer body. The shape, size and composition of the transducer determines the mechanical resonant frequency thereof, and a power supply capable of delivering a frequency equal to the resonant mechanical frequency is employed to drive the transducer in the performance of its intended function.

The vibrational energy of the transducer is concentrated at one end via an exponential horn 1021, typically connected to the transducer body by a screw 1022 and provided at its free end with an element for coupling the vibrational energy to the work.

In the case of wire bonding the vibrational energy is directed in a plane parallel to the surface of the elements to be joined, and accordingly the member for coupling energy from the horn to the work is a wedge 1023 supported in a transverse bore through the horn 1021 and held in place via a set screw 1024.

The workpieces are supported beneath the wedge 1023 from an anvil 1025 onto which the lower of the pieces 1026 such as an integrated circuit chip support or transistor can is clamped such as by a chuck 1027. The other member 1028 to be joined to the piece part 1026 is located between the lower end of wedge 1023 and the piece part 1026. In the case of wire bonding the part 1028 is a wire on the order of 0.0005 to 0.001 inch which is fed from a spool (not shown) into bonding location. For accurate location of such a fine wire a small aperture is often provided in the heel portion of the wedge so that the wire can be threaded therethrough into location beneath the forward portion of the wedge.

A weight 1029 is provided on the transducer mounting assembly to produce the desired amount of static force to hold the work members together during the bonding operation.

A bond is accomplished typically by rotating the transducer 1014 about the pivot 1012 to drop the lower edge of the wedge 1023 onto the workpieces. Then, the high frequency signal is applied from the power supply to the active element 1017 for a very short period of time so that a bond results.

Depending upon the size, shape and composition of the elements between the active member 1017 and the surface where a bond is to be created between parts 1026 and 1028, there are certain frequencies of mechanical resonance at which the assembly can be excited at large amplitudes with a sinusoidal electrical signal input. Numerous changes in the transducer and coupling elements can result in a change in impedance presented to the power supply 1019.

A power supply useful in ultrasonic wire bonding wherein changes of impedance do occur is one in which the power delivered to the transducer is controlled in accordance with these changes in impedance. Such a power supply is described in U.S. Pat. No. 3,445,750 referred to above.

Figure 2:
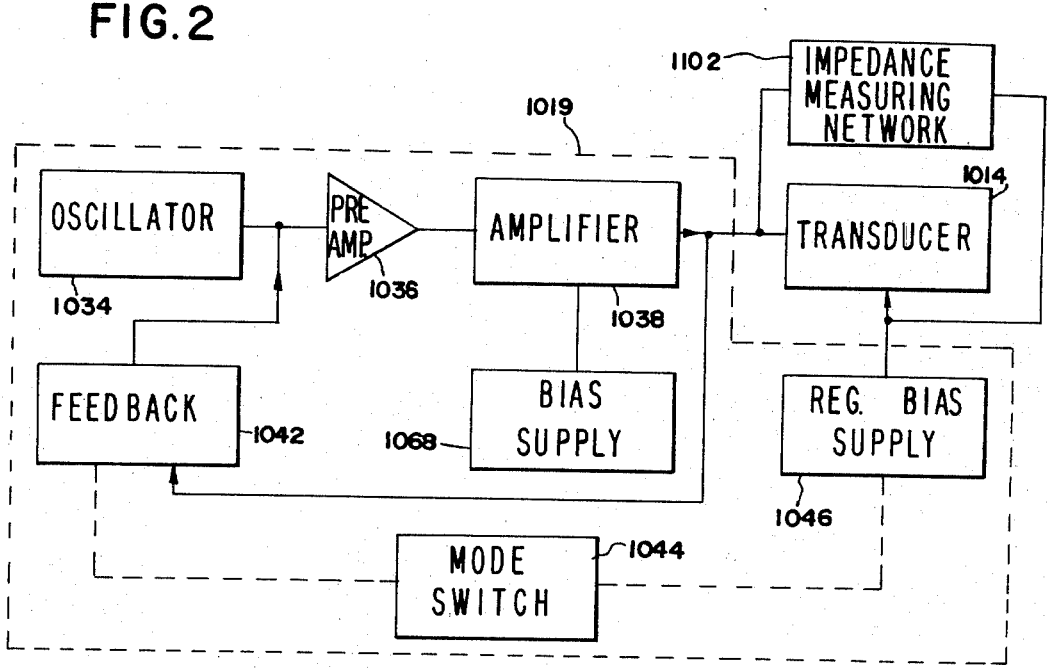
FIG. 2 is a block diagrammatical view of the power supply for an ultrasonic wire bonder incorporating the impedance measuring network.

Referring now to FIG. 2, there is shown an ultrasonic power supply 1019 of the type usable in connection with the present invention. An oscillator 1034 generates a sine wave having a frequency substantially equal to the resonant frequency of the transducer 1014 and load. A signal from feedback circuit 1042 along with the output of oscillator 1034 are applied to preamplifier 1036 and to an amplifier 1038. Precise regulation of the amplifier 1038 is provided by a bias supply 1068. A mode switch 1044 operates in conjunction with feedback circuit 1042 and a fixed regulated bias supply 1046 to provide either a constant current or a constant voltage to transducer 1014, depending on the type of transducer used, either magnetostrictive or electrostrictive, respectively. Bias supply 1046 provides a fixed DC bias for magnetostrictive transducers. A power supply of this type is explained in greater detail in the referenced patent.

Figure 3:
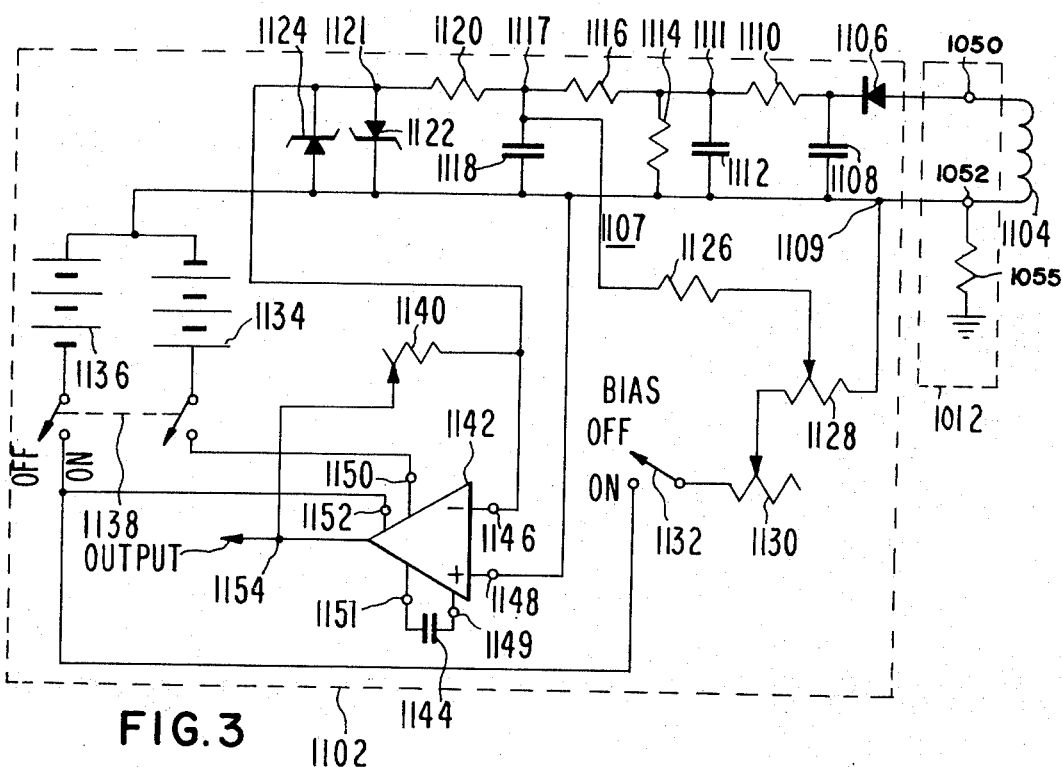
FIG. 3 is a schematic circuit diagram of a preferred embodiment of the impedance measuring network according to the invention of the referenced application.

An impedance measuring network 1102 according to this invention is connected across the transducer 1014. Referring now to FIG. 3, the details of network 1102 are shown. Network 1102 is connected to terminals 1050 and 1052 of an ultrasonic power supply. A transducer coil 1104 is connected to terminals 1050 and 1052. A low valued resistor 1055 provides a voltage proportional to current flow through coil 1104 when the power supply operates in the constant current output mode. Thus a voltage input to impedance network 1102 is always presented at terminals 1050–1052.

The signal applied to network 1102 is half wave rectified by a diode 1106 connected with its anode to terminal 1050 so that positive pulses are provided at its cathode for smoothing in a filter network 1107 consisting of a capacitor 1108 connection from the anode of diode 1106 to a junction 1109 connected to terminal 1052, a resistor 1110 connected from the anode of diode 1106 to a junction 1111, a capacitor 1112 connection from junction 1111 to junction 1109, a resistor 1114 connected across capacitor 1112, a resistor 1116 connected between junction 1111, and a junction 1117, a capacitor 1118 connected between junction 1117 and junction 1109 and a resistor 1120 connected between junction 1117 and a junction 1121. A pair of back-to-back Zener diodes 1122 and 1124 are connected between junctions 1121 and 1109 in order to limit the voltage output from the filter. Capacitors 1108, 1112 and 1118 are electrolytic capacitors of the type normally used in power supply applications.

The Zener limited filter output at junction 1121 is applied to the negative input 1146 of an operational amplifier (op. amp.) 1142. The positive input 1148 is taken from junction 1109. Capacitor 1144 is connected across terminals 1149–1151 thus causing op. amp. 1142. The positive input 1148 is taken from junction 1109. A feedback loop consisting of capacitor 1144 is connected across terminals 1149–1151 to stabilize the op. amp. to prevent self-oscillations. Amplifier 1142 also provides gain necessary to drive the external display device and in addition provides isolation from the ultrasonic power supply. A potentiometer 1140 connected between op. amp. terminals 1140 and 1154 adjusts the amplifier gain. The network 1102 output is taken at terminal 1154. A DC supply source such as batteries 1134 and 1136 provide a positive and negative power supply to terminals 1150 and 1152 of op. amp. 1142 respectively. DPST switch 1138 switches the voltages to turn the amplifier on and off.

When the switch 1138 is on, a negative voltage is also applied to an SPST "bias" switch 1132 and to an end of a potentiometer 1130. The rider of pot 1130 is connected to one end of a pot 1128 which has its other end connected to a junction 1109. The rider of pot 1128 is connected through resistor 1126 to junction 1117. This "bias" voltage allows the output signal from network 1102 to be adjusted so that only a portion of the total waveform is presented. By doing this, for example, the peak of a waveform may be looked at with greater magnification on a display device.

In operation, when the current or voltage through transducer coil 1104 remains constant, a constant amplitude sine wave voltage is applied to network 1102. The inputs to op. amp. 1142 are thus steady DC voltages that are compared to provide a zero output at terminal 1154. However, as the impedance of the transducer and load changes, the sine wave will change thus causing the input to op. amp. 1142 to vary from the former steady state DC level. The variation is differentially compared to provide an output at terminal 1154. The structure of the waveform at terminal 1154 has been found to provide information as to the nature of the ultrasonic porcess being performed. Such waveforms are shown in FIGS. 7–12, described hereinafter.

Figure 4:
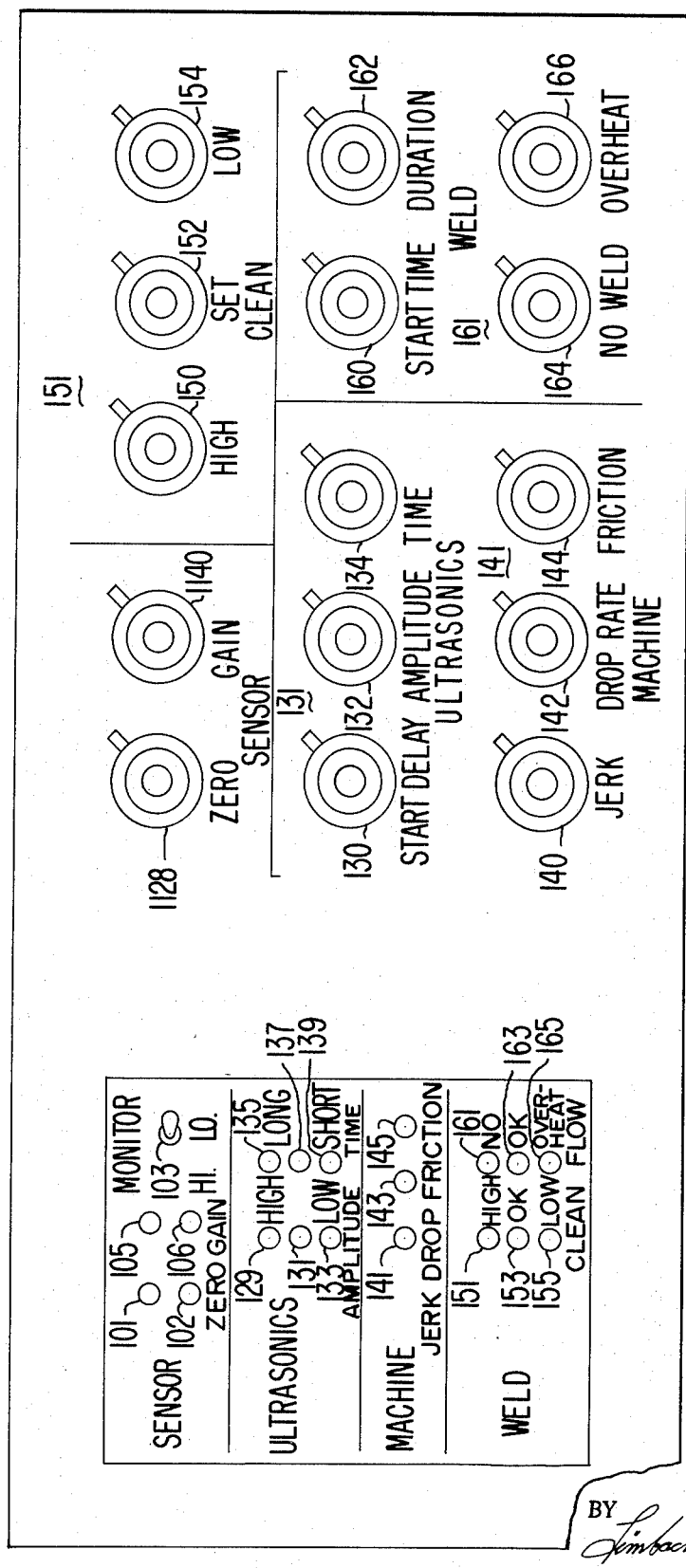
FIG. 4 is a view of the front panel of an embodiment of the weld quality analyzer according to the present invention.

Referring now to FIG. 4, the control panel of an embodiment of the weld quality analyzer according to the present invention is shown having a plurality of controls for adjusting various parameters of the device and having a plurality of visual display devices or lamps to indicate the satisfactory or unsatisfactory condition of various parameters being detected. The controls and indicators will be better understood in connection with FIGS. 7–12, which will be referred to as FIG. 4 is discussed. Sensor zero control 1128 affects the location of the waveforms of FIGS. 7–12 along the y-axes and sensor gain control 1140 controls the amplitude of the waveform. These controls form a part of impedance measuring network 1102 of FIGS. 2 and 3. Ordinarily, these controls are adjusted once for a particular power supply and ultrasonic transducer. Green monitor lamps 101 and 105 will light if the sensor zero and gain controls are properly adjusted; conversely if they are not, either or both red lamps 102 and 106 will go on.

Weld clean controls 151 are used in connection with the sensing of the cleaning function. Ultrasonic welding takes place in two steps: (1) cleaning and heating and (2) welding. By measuring the ultrasonic energy in the waveform of FIG. 7 during the time $t_0$ to $t_1$, an indication of the cleaning function can be derived. Thus weld clean set control 152 adjusts the desired cleaning energy and high and low controls 150 and 154 set upper and lower thresholds. If the cleaning energy is in the desired range, weld clean green OK lamp 153 lights. If the thresholds are exceeded high red lamp 151 or low red lamp 155 goes on. The exact manner of this operation and that of the other functions will be better understood when the description of FIGS. 5 and 6 have been read.

Ultrasonic controls 131 are used to double check the power supply to assure that the ultrasonic signal to the transducer is within a desired amplitude range and that the signal is on for only a certain length of time. If a check on the accuracy of the power supply amplitude and timing is not desired, this portion of the analyzer may be omitted. Start delay control 130 is used in conjunction with programmed power supplies and is described in more detail hereinafter. Amplitude and time controls 132 and 134 are set to the desired values. If the amplitude and time are correct, green lamps 131 and 137 will light. If they are either high or low, or long or short, red lamps 129, 133 or 135, 139 will light.

Figure 8:
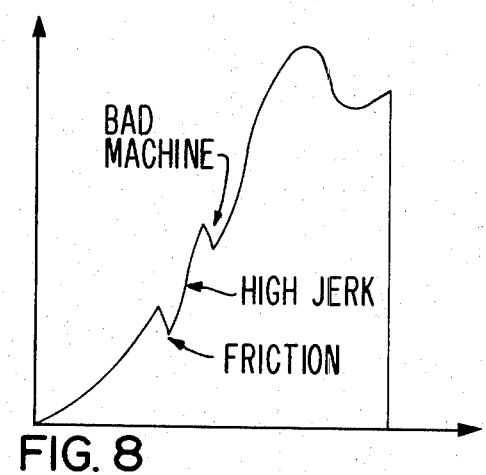
Figure 9:
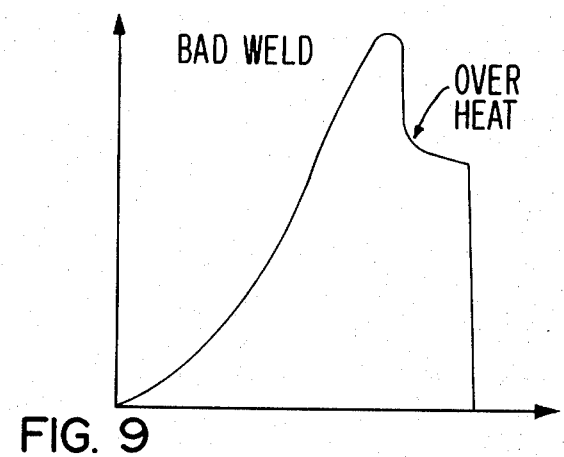
Figure 10:
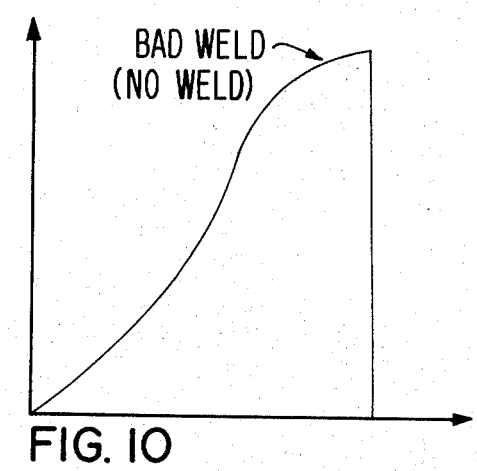

Machine controls 141 are directed to functions of the mechanical apparatus including the transducer pivoting and the like. The machine drop rate is adjusted by control 142. A tolerance threshold for machine jerk is set by control 140; friction by control 144. FIG. 8 shows waveforms exhibiting friction and jerk. If the drop rate is within limits, green lamp 143 is lit. Red lamp 141 and 145 light in case of excessive jerk or friction.

Figure 7:
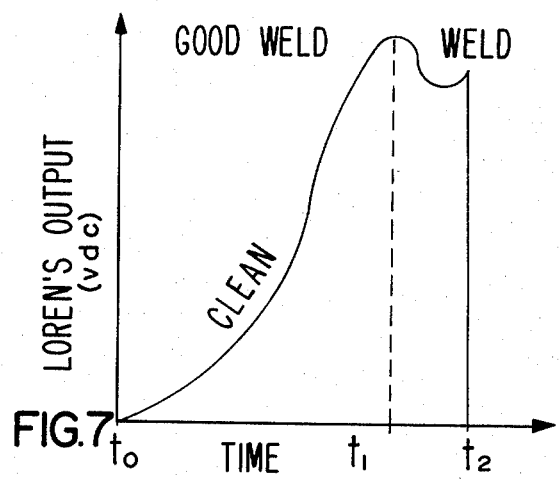
FIG. 7-12 are graphs useful in understanding the present invention, showing typical impedance signal waveforms received from the impedance measuring network of the referenced application.

Weld controls 161 pertain to the weld period of the waveform as in FIG. 7 from $t_1$ to $t_2$. Start time control 160 adjusts a timing circuit to begin at $t_1$, the time at which the weld should begin; control 162 adjusts a second time period that should last from $t_1$ to $t_2$, the period during which the weld should take place. "No weld" control 164 sets the level for sensing a weld from the dip in the waveform as in FIG. 4 from $t_1$ to $t_2$. Overheat control 166 sets the threshold for sensing too great of a dip or overheating as in FIG. 9. Associated lamps 161, 163 and 165 (red, green, red) indicate no weld, OK, and overheat, respectively.

Figure 5:
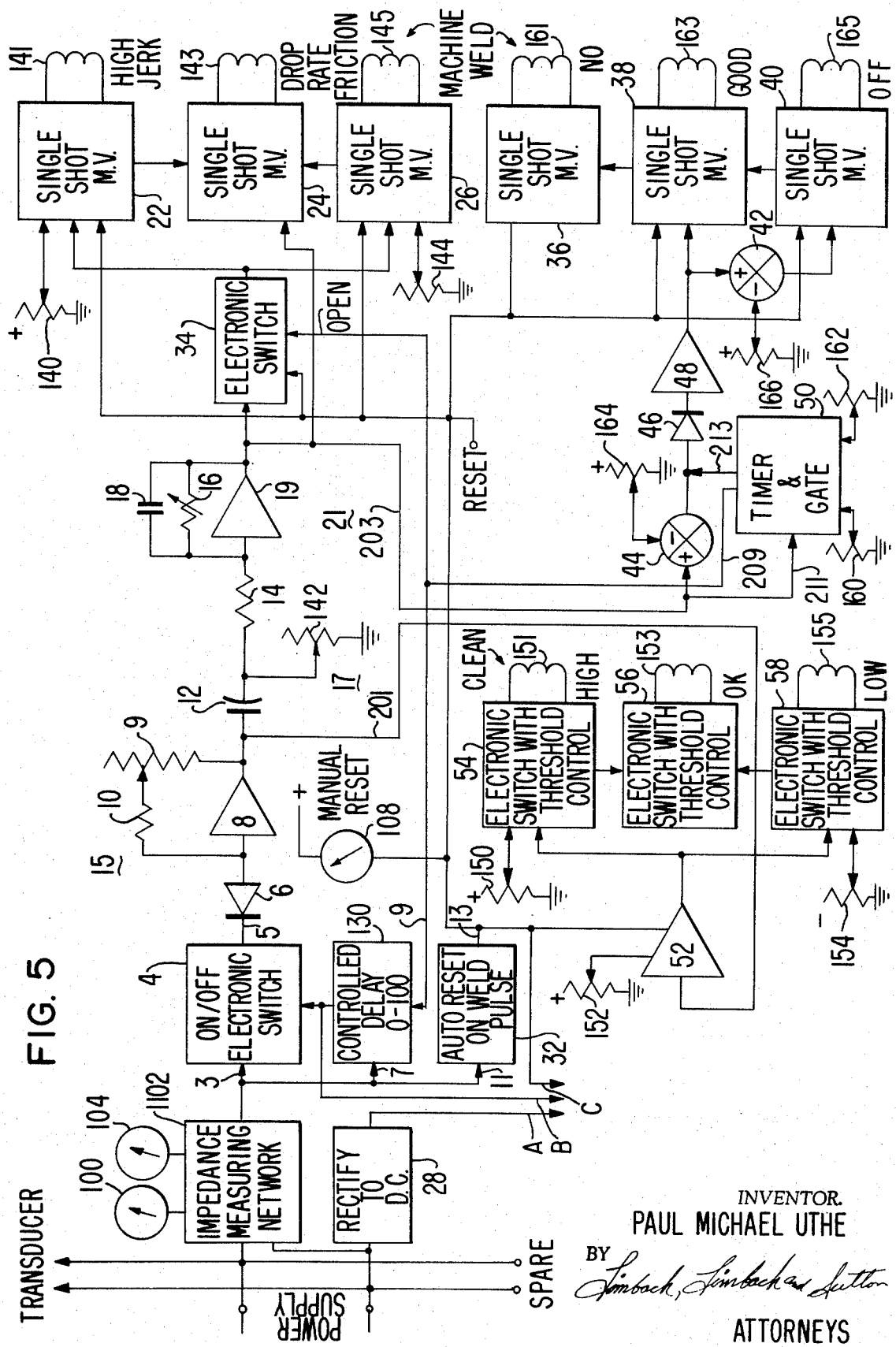
FIG. 5 is a schematic circuit diagram, partially in block form, of a portion of an embodiment of the weld quality analyzer apparatus of the present invention.
Figure 6:
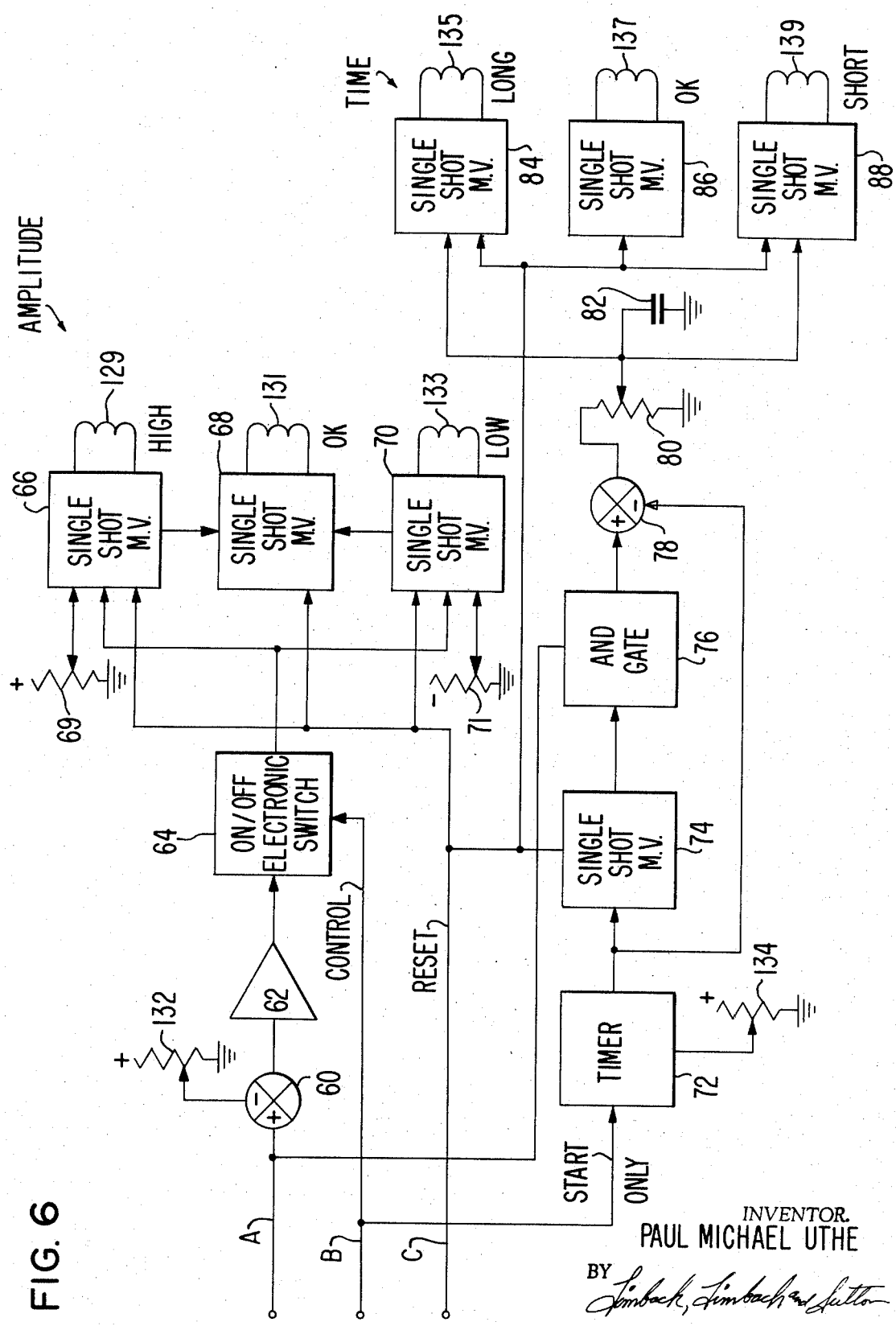
FIG. 6 is a further schematic circuit diagram, partially in block form, of a portion of an embodiment of the weld quality analyzer apparatus of the present invention.

Referring now to FIG. 5, the output of impedance measuring network 2 is applied to an on/off electronic switch 4, an adjustable delay unit 130, and to an automatic reset unit 32. Switch 4 is off until turned on by delay unit 30 after the delay time has run, thereby providing the signal from network 2 at the output 5 of switch 4. Delay unit 130 is used primarily for compatibility with a programmed power supply unit which forms no part of the present invention. For ease in understanding this invention it should be assumed that the delay is zero and thus switch 4 is turned on immediately when a signal is received on line 3. Delay 130 also provides a signal on line B to another circuit of the invention that will be explained hereinafter. Delay 130 is reset by a pulse on line 9 from a portion of the circuit to be explained below. Automatic reset unit 32 provides a reset pulse on line 13 when a weld pulse is applied to its input 11. As will be explained below, the reset pulse, which also may be manually generated by a single pole-single throw switch 108, is derived from the waveform from network 2 and applies a voltage for resetting various single-shot multivibrators and an integrating amplifier.

Output 5 of switch 4 is applied first to a logarithm amplifier 15 consisting of a series diode 6, having its cathode connected to output 5, and a high gain operational amplifier 8 with a series resistive feedback loop including a potentiometer 104, which acts as sensor gain, and a resistor 10 connected to the potentiometer 104 arm. If $v_1$ is the input to the logarithmic amplifier, then $v_2 = (R_1 + R_2) \ln v_1$ is the output. The signal $v_2$ is applied to line 201, which is discussed below, and to a differentiator 17 consisting of a capacitor 12 and a potentiometer 142. Potentiometer 142 alters the machine drop rate sensitivity by adjusting the differentiation. The differentiated signal $d\, v_2/dt$ is applied to a low pass filtering amplifier 21 consisting of input resistor 14 and a parallel adjustable resistor 16 and capacitor 18 in the feedback path of a high gain operational amplifier 19. The feedback circuit is adjusted to roll off high frequencies so as to suppress the transducer vibration frequency. The amplifier output is applied to line 203, to be described below, and to electronic switch 34 that is initially closed, but opens upon receipt of a pulse on line 213 as will be explained below, from line 205, which is described hereinafter. The output of device 20 is applied to single shot multivibrators (hereafter "single-shot") 22 and 24. A positive voltage is also applied to single shot 22 by threshold potentiometer 140 connected between a positive voltage source and a ground and likewise a negative voltage is also applied to single shot 26 by threshold potentiometer 144 connected between a negative voltage and ground. Single shot 24 is ordinarily "on" unless turned off by a single shot 22 when the signal from device 20 exceeds the positive threshold indicating jerk or when the signal is below the negative threshold indicating friction. Each single shot is reset by a pulse on line 13 from the auto or manual reset. Single shot 22 when on activates a red lamp 141; single shot 24 activates a green lamp 143; and single shot 26 activates red lamp 145. Referring briefly to FIG. 7, it will be seen that during the time period from $t_0$ to $t_1$, the waveform is generally exponential. Thus by taking the logarithm of the waveform a straight line or constant signal is generated and its derivative is zero. Thus the output of switch 34 is zero, and the green light 143 is lit. However, if as in FIG. 8, the waveform suddenly dips (friction) or rises (high jerk), the derivative of the logarithm will be positive or negative, and may trigger single shot 22 or 26 if the thresholds are exceeded.

Line 203 from low pass filtering amplifier 21 is connected to line 207. Line 207 is connected to a "timer start" input 211 of a timer/gate 50 and to the positive input of summing device 44. The negative input of device 44 is provided from the arm of a potentiometer 164 connected between a positive voltage source and ground. Pot 164 acts as level control or "no" limit for the weld flow indication as will be seen below. The output of device 44 is applied to the cathode of a series diode 46 and to a high gain operational amplifier 48. A gate control output 213 of timer/gate 50 is also applied to the cathode of diode 46. Amplifier 48 output is applied to a single shot 38 and to the positive terminal of a summing device 42. The negative input of device 42 is connected to the arm of a potentiometer 166 which is connected between a positive voltage source and ground. The output of device 42 is applied to a one shot 40. One shot 40 when activated drives a red lamp (overheat) 165 and turns off one shot 38. One shot 38 when on drives a green lamp (good weld) 163 and provides an off pulse to single shot 36 that operates red lamp (no weld) when activated. One shots 36, 38, and 40 are reset by line 13. In operation, one shot 36 is on indicating no weld until the signal reaches a certain level determined by pot 164 then the green light 163 comes on. If a certain level is exceeded as set by pot 166, indicating overheating, one shot 40 fires, turns 38 off, and lights overheat red lamp 165.

The timing function of timing/gate 50 is activated by a signal on line 211. Potentiometers 160 and 162 control a 0–200 ms weld start time interval and a 0–20 ms weld time interval, respectively. Referring briefly to FIG. 7 the weld start time runs from $t_0$ to $t_1$ and is predetermined for given materials being bonded. The weld time lasts from $t_1$ to $t_2$. At $t_2$ the weld pulse occurs, that is an upswing in the dip that occurs during weld time $t_1$ to $t_2$. The weld pulse resets the system automatically through auto reset unit 32 as described above. During weld start time, $t_o - t_1$, gate output on line 213 biases diode 46 off so that no signal reaches amplifier 48. When the weld start period ends, the weld time begins; bias is removed from diode 46, a pulse on line 209 opens switch 34 and resets delay 130. When switch 34 opens no signal is applied to the machine indicators so that the weld dip from $t_1$ to $t_2$ will not falsely register as friction. Diode 46 receives the same differentiated log signal from amplifier 19 and passes only the negative portion thereof; thus the circuit is looking for the weld dip that should occur from $t_1$ to $t_2$. If enough signal is received green lamp 163 is lit and prevents red no lamp 161 from going on. Conversely, if too much signal is received there is overheating, and lamp 165 goes on.

The signal $v_2 = (R_1 + R_2) \ln v$, is applied via line 201 to an integrating operational amplifier 52 in the weld clean sensing circuit. The integrated log signal is a measure of the average energy and hence indicates how much frictional scrubbing, heating and cleaning is being done. A potentiometer 152 connected between a source of positive potential and ground has its arm connected to the amplifier to provide a level set. Reset line 13 is connected to amplifier 52. The amplifier 52 output is applied to an electronic switch 151 and to an electronic switch 155. Switch 151 has a high limit threshold set by potentiometer 150 connected between a positive potential and ground; switch 155 has a low limit threshold set by potentiometer 154 connected between a negative potential and ground. A further electronic switch 153 is normally on and is turned off when either switch 151 or 155 turns on. Switches 151, 153, and 155 control red lamp 151, green lamp 153, and red lamp 155, respectively. Whenever the amplifier 52 output rises above the high threshold, switch 54 goes on lighting red high lamp 151 and conversely when the output falls below the low threshold, switch 58 turns on.

A rectifier 28 is connected to the external power supply and provides a DC signal to line A. Line A is connected to the positive input summing device 60 and to an input of an AND-gate 76. The negative input of summing device 60 is connected to the arm of a potentiometer 132 connected between a positive supply source and ground. The device 60 output is applied to the input of a high gain operational amplifier 62; the output thereof is switched by an on/off switch 64 that is controlled by the control signal on line B. The line B signal is also connected to the start only input of a 0–200 ms timer 72. The timer is adjusted by a potentiometer 134 connected between a positive supply source and ground. Referring again to the switched output of amplifier 62, it is applied to single shots 66 and 70 of the ultrasonic amplitude sensing circuit. A plus limit percent (positive threshold) on single shot 66 is provided by a potentiometer 69 connected between a positive supply and ground; likewise, a minus limit percent (negative threshold) on single shot 70 is provided by potentiometer 71 connected between a negative supply and ground. A further single shot 68, normally on, is connected so as to be turned off when single shot 66 or 70 turn on. Single shots 66, 68, and 70 are all reset by line C, and are connected respectively to red lamp 129, green lamp 131 and red lamp 133. Thus when the signal from switch 64 exceeds the level preset by pot 69, green lamp 131 goes off and high red lamp 129 goes on or when the signal drops below the level preset by pot 71, red lamp 133 lights. This circuit thus checks the power supply to assure it is providing a signal of the proper amplitude.

Timer 72 has its output connected to a single shot 74 and to the negative input of a summing device 78. Single shot 74 is reset by line C and has its output connected to AND-gate 76. Thus when single shot 74 is on, the output from AND-gate 76 will be the signal on line A which is applied to the positive input of summing device 78. Device 78 output is connected to one end of a potentiometer 80 which has its other end connected to a capacitor 82, which is further connected to ground, and to the inputs of single shots 84 and 88 that are connected to turn off single shot 86 when they are turned on. The single shots 84, 86, and 88 are connected, respectively, to red long lamp 135, green lamp 137, and red short lamp 139. The thresholds of single shots 84 and 88 are preadjusted during manufacture.

Figure 11:
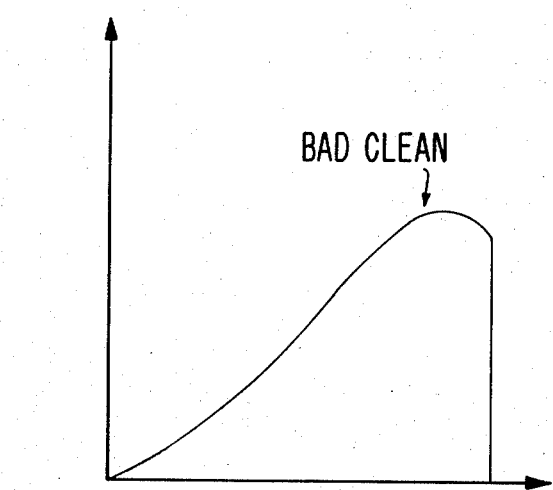
Figure 12:
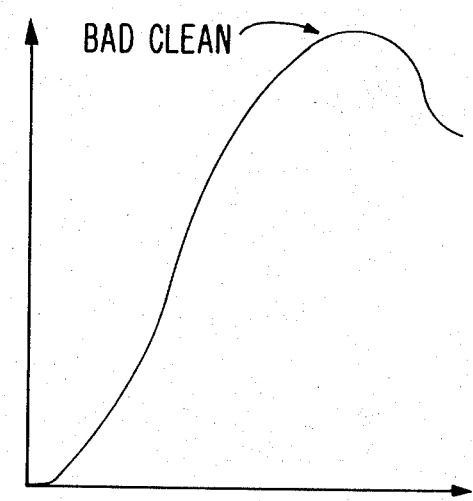

The remaining figures illustrate other waveforms indicative of unsatisfactory weld quality. For example, in FIG. 10 there is no weld because the signal does not dip down during the weld time period. Thus, in FIG. 5 no signal would be received at amplifier 48 to be applied to single shot 38. Thus single shot 36 would remain lit and red no weld light 161 would be on. In FIG. 11, there is a bad clean. The circuit of FIG. 5 would recognize this as an insufficient area under the waveform; thus the output of amplifier 52 would be below the low threshold limit and red low lamp 155 would light. Conversely, in FIG. 12, there is also a bad clean; the area under the waveform is too great and high red lamp 151 would light. Thus the timer circuit functions to double check the timing of the power supply. For example if the power supply goes off before timer 72, then there will be a negative signal at the integrating RC arrangement 80–82 and short red light 139 will go on. Conversely, if the power supply stays on longer than timer 72, a positive signal will build up and light lamp 135.

I claim:

1. A method of analyzing the quality of the welding process in an ultrasonic welding system including a transducer acting on a load comprising
   generating a waveform signal that is a function of the transducer and load impedance,
   generating a signal that is the logarithm of said impedance signal,
   integrating said logarithm signal with respect to time to provide a weld clean signal, and
   differentiating said logarithm signal with respect to time to provide a machine signal.

2. The method of claim 1 further comprising rectifying said machine signal to provide a weld signal when said machine signal goes negative.

3. The method of claim 2 wherein said step of generating a waveform signal that is a function of the transducer and load impedance comprises
   rectifying the transducer voltage,
   low pass filtering the rectified transducer voltage to provide positive and negative outputs, and
   differentially amplifying said positive and negative outputs to provide said impedance signal.

4. The method of claim 3 further comprising
   comparing said weld clean signal to selectable upper and lower weld clean threshold signal levels and providing alarm signals if said upper or lower weld clean signal limits are exceeded,
   comparing said machine signal to selectable upper and lower machine signal levels, and
   providing alarm signals if said upper or lower machine signal limits are exceeded.

5. The method of claim 4 further comprising comparing said weld signal to selectable upper and lower weld signal threshold signal levels, and providing alarm signals if said upper or lower weld clean signal limits are exceeded.

6. The method of claim 5 further comprising
   deriving a signal that is a function of the voltage to the ultrasonic transducer in said system,
   rectifying said signal,
   comparing said rectified signal to selectable upper and lower voltage limits, and
   generating an alarm signal if said limits are exceeded.

7. The method of claim 6 further comprising
   comparing the time duration of said rectified voltage to selectable long and short time limits, and
   generating an alarm signal if said limits are exceeded.

8. Apparatus for analyzing the quality of the welding process in an ultrasonic welding system including a transducer acting on a load comprising
   means for generating a signal that is a function of the transducer and load impedance,
   means receiving said impedance signal for providing an output signal that is the logarithm of said impedance signal,
   means for integrating said logarithm signal with respect to time to provide a weld clean signal,
   means for differentiating said logarithm signal with respect to time to provide a machine signal.

9. The apparatus of claim 8 further comprising means for rectifying said machine signal to provide a weld signal when said machine signal goes negative.

10. Apparatus according to claim 9 wherein said means for generating a signal that is a function of the impedance of the transducer and load comprises
    a rectifier connected to said transducer,
    a low pass filter network having positive and negative outputs connected to said rectifier, and
    differential amplifier means receiving a pair of inputs from the positive and negative outputs of said filter network for providing said impedance signal.

11. The apparatus of claim 10 further comprising
    means for comparing said weld clean signal to selectable upper and lower weld clean threshold signal levels, and
    means for providing alarm signals if said upper and lower weld clean signal limits are exceeded,
    means for comparing said machine signal to selectable upper and lower machine signal levels, and
    means for providing alarm signals if said upper and lower machine signal limits are exceeded.

12. The apparatus of claim 11 further comprising
    means for comparing said weld signal to selectable upper and lower weld signal threshold signal levels, and
    providing alarm signals if said upper or lower weld clean signal limits are exceeded.

13. The apparatus of claim 12 further comprising means for monitoring the voltage to the ultrasonic transducer in said system,
    means for rectifying said transducer voltage,
    means for comparing said rectified voltage to selectable upper and lower voltage limits,
    means for generating an alarm signal if said limits are exceeded.

14. The apparatus of claim 13 further comprising
    means for comparing the time duration of said rectified voltage to selectable long and short time limits, and means for generating an alarm signal if said limits are exceeded.

15. The apparatus of claim 14 further comprising means for inhibiting said weld signal for a selectable initial time period.

16. The apparatus of claim 15 further comprising means for inhibiting said machine signal upon generating of said weld signal.

* * * * *